Patented Jan. 3, 1950

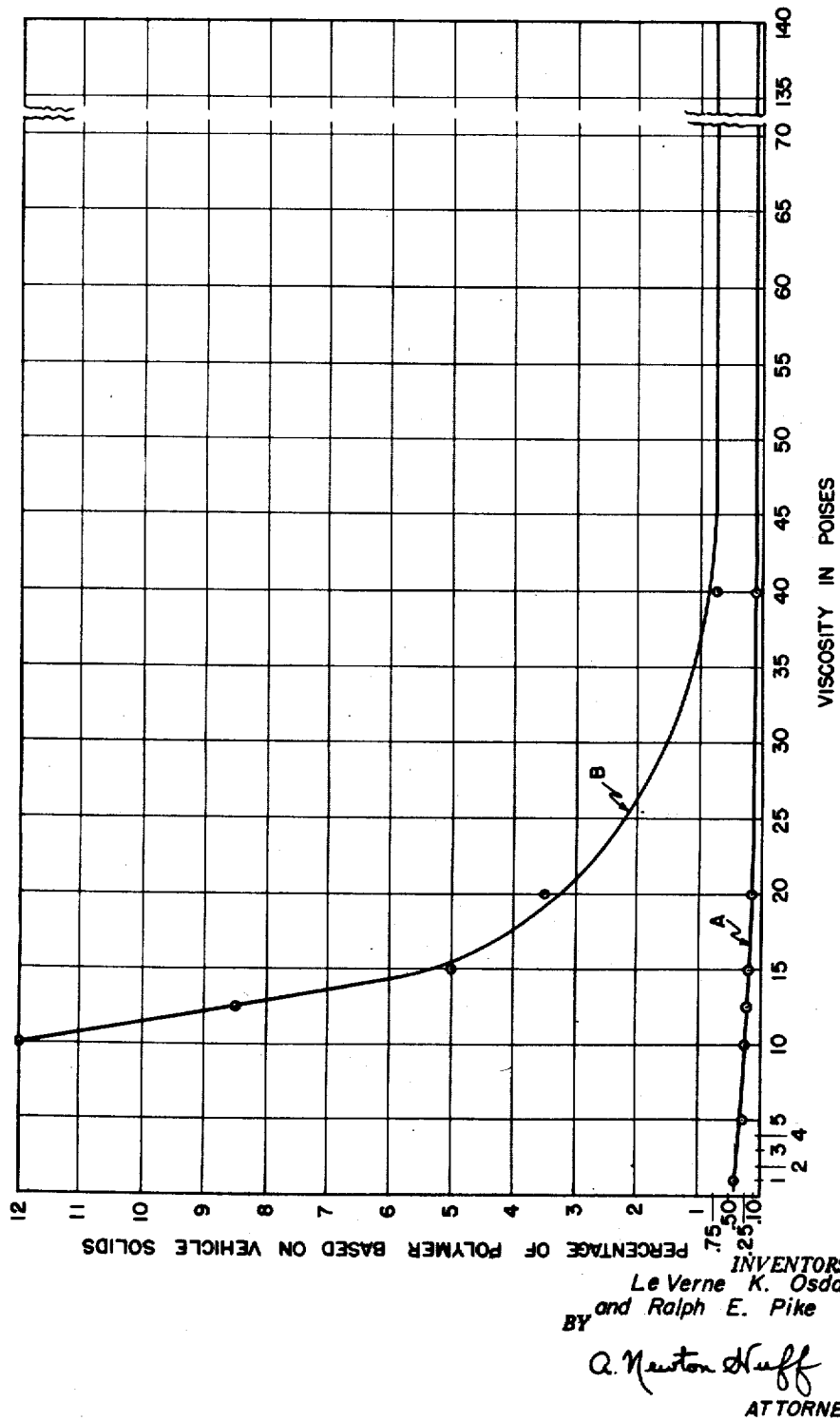

2,493,020

UNITED STATES PATENT OFFICE 2,493,020

SYNTHETIC RESIN METALLIC ENAMELS

Le Verne Kenneth Osdal, Upper Darby, and Ralph E. Pike, Media, Pa., assignors to E. I. du Pont de Nemours & Company, Wilmington, Del., a corporation of Delaware Application February 10, 1948, Serial No. 7,436

5 Claims. (Cl. 260—22)

This invention relates to new and novel coating compositions and, more particularly, to synthetic resin coating compositions having a polychromatic or metallic appearance.

Metallic coating compositions formulated with nitrocellulose lacquers have been in use for several years and have become very popular, particularly for use on automobiles, the metallic appearance being caused by the presence of a small amount of fine aluminum flakes uniformly dispersed in the lacquer.

However, attempts to produce similar metallic coating compositions with synthetic resin vehicles have been discouraging because, when a synthetic resin coating composition containing aluminum flakes was sprayed on a surface, the aluminum flakes tended to migrate into colonies or flocculated, imparting an undesirable mottled appearance to the film. Such migration does not occur in metallic nitrocellulose lacquers.

This invention therefore has as its principal object the production of synthetic resin coating compositions which will present a metallic appearance and a uniform surface exhibiting no mottling, flocking, or "flooding" when sprayed.

Another object is the production of such coating compositions which can be satisfactorily "patched" or repaired when necessary.

An additional object is the production of such coating compositions which will have a high build, a good gloss, and the desired metallic appearance.

A further object is the production of such coating compositions which will have good outdoor durability.

A still further object is the production of such coating compositions which will not "sag" on spaying and which may be reduced with an inexpensive hydrocarbon thinner.

These and other objects, which will become apparent as the description proceeds, are accomplished in this invention by adding a β-dialkylaminoalkylmethacrylate polymer to a synthetic resin vehicle containing aluminum flakes.

The following examples are illustrative of the invention, the parts being by weight:

EXAMPLE 1

Metallic Blue baking enamel

| | Per cent |
|---|---|
| Monoastral Blue | .88 |
| Bone black | .31 |
| Aluminum paste | .19 |
| Alkyd resin A solution (55% solution in high flash petroleum naphtha) | 4.76 |
| Alkyd resin B solution (50% solution in high flash petroleum naphtha) | 19.08 |
| Melamine formaldehyde solution (50% solution in butyl alcohol | 2.99 |
| β - Diethylaminoethylmethacrylate polymer solution (23% solution in acetone) | .06 |
| Oil-modified phenol formaldehyde solution (60% solution in petroleum xylol) | .15 |
| Manganese naphthenate drier | .15 |
| Ethyl acetate | 21.10 |
| Low flash aliphatic petroleum naphtha | 31.65 |
| Toluol | 13.55 |
| Mineral spirits | .86 |
| High flash petroleum naphtha | 4.27 |
| | 100.00 |

Alkyd resin A was a 52% linseed oil-modified glyceryl phthalate.

Alkyd resin B was a 45% linseed oil-modified glyceryl phthalate.

The oil-modified phenol formaldehyde used in this and the following examples was a 32% China-wood oil-modified phenol formaldehyde resin.

The aluminum paste used in this and Examples 2–7, 13, and 14 had the following composition:

| | Per cent |
|---|---|
| Aluminum powder | 66 |
| V. M. & P. naphtha | 33 |
| Stearic acid | 1 |
| | 100 |

The manganese drier used in this and the following examples was a solution in mineral spirits containing 3% of the metal.

This enamel contained 0.12% of β-diethylaminoethylmethylacrylate based on the solids of the alkyd resin present, the polymer having a high degree of polymerization, i. e., a 50% solution in xylene had a viscosity of 80 poises.

EXAMPLE 2

Metallic Gray baking enamel

| | Per cent |
|---|---|
| Bone black | .67 |
| Lamp black | .68 |
| Red iron oxide | .48 |
| Rutile titanium dioxide | 1.83 |
| Alkyd resin A solution (55% solution in high flash petroleum naphtha) | 10.81 |
| Alkyd resin A solution (75% solution in high flash petroleum naphtha) | .33 |
| Alkyd resin C solution (50% solution in high flash petroleum naphtha) | 54.78 |
| Aluminum paste | .70 |
| Oil-modified phenol formaldehyde solution (60% solution in petroleum xylol) | 1.33 |
| Butanol-modified urea formaldehyde solution (33% solution in 33% butyl alcohol and 67% high flash petroleum naphtha) | 2.21 |
| Manganese naphthenate drier | .40 |
| High flash petroleum naphtha | 25.10 |
| Soya lecithin solution (50% solution in mineral spirits) | .04 |
| Creosole solution (1% solution in mineral spirits) | .08 |
| β-Diethylaminoethylmethacrylate polymer solution (50% solution in toluol) | .56 |
| | 100.00 |

Alkyd resin C was a 17% dehydrated castor oil/33% soya bean oil-modified pentaerythritol glyceryl phthalate.

This enamel contained 0.83% of β-diethylaminoethylmethylacrylate based on the solids of the alkyd resin present, the polymer having a medium low degree of polymerization, i. e., 50% solution in xylene had a viscosity of 2 poises.

EXAMPLE 3

Metallic Gray baking enamel

| | Per cent |
|---|---|
| Bone black | .66 |
| Lamp black | .67 |
| Red iron oxide | .48 |
| Rutile titanium dioxide | 1.82 |
| Alkyd resin A solution (55% solution in high flash petroleum naphtha) | 10.75 |
| Alkyd resin D solution (50% solution in high flash petroleum naphtha) | 54.51 |
| Alkyd resin A solution (75% solution in high flash petroleum naphtha) | .33 |
| β-Diethylaminoethylmethacrylate polymer solution (50% solution in toluol) | .67 |
| Aluminum paste | .69 |
| Oil-modified phenol formaldehyde solution (60% solution in petroleum xylol) | 1.32 |
| Butanol-modified urea formaldehyde solution (33% solution in 33% butyl alcohol and 67% high flash petroleum naphtha) | 2.19 |
| Manganese naphthenate drier | .40 |
| High flash petroleum naphtha | 25.39 |
| Soya lecithin solution (50% solution in mineral spirits) | .04 |
| Creosole solution (1% solution in mineral spirits) | .08 |
| | 100.00 |

Alkyd resin D was a 50% linseed oil/China-wood oil-modified glyceryl phthalate.

This enamel contained 1% of β-diethylaminoethylmethacrylate based on the solids of the alkyd resin present, the polymer having a medium low degree of polymerization, i. e., a 50% solution in xylene had a viscosity of 2 poises.

EXAMPLE 4

Metallic Gray baking enamel

| | Per cent |
|---|---|
| Lamp black | 1.67 |
| Aluminum paste | 1.13 |
| Alkyd resin A solution (55% solution in high flash petroleum naphtha) | 20.45 |
| Alkyd resin E solution (50.5% solution in high flash petroleum naphtha) | 46.20 |
| Oil-modified phenol formaldehyde solution (60% solution in petroleum xylol) | .43 |
| Butanol-modified urea formaldehyde solution (33% solution in 33% butyl alcohol and 67% high flash petroleum naphtha) | 3.05 |
| High flash petroleum naphtha | 25.83 |
| β-Diethylaminoethylmethacrylate polymer solution (50% solution in xylene) | .70 |
| Manganese naphthenate drier | .54 |
| | 100.00 |

Alkyd resin E was a 50% linseed oil-modified glyceryl phthalate.

This enamel contained 1% of β-diethylaminoethylmethacrylate based on the solids of the alkyd resin present, the polymer having a medium low degree of polymerization, i. e., a 50% solution in xylene had a viscosity of 1.7 poises.

EXAMPLE 5

Metallic Gray baking enamel

| | Per cent |
|---|---|
| β-Diethylaminoethylmethacrylate/ethylmethacrylate copolymer solution (50% solution in xylene) | .88 |
| Aluminum paste | .51 |
| Carbon black | 2.09 |
| Alkyd resin A solution (55% solution in high flash petroleum naphtha) | 25.55 |
| Alkyd resin F solution (75% solution in 66% high flash petroleum naphtha and 34% mineral spirits) | 38.09 |
| Butanol-modified urea formaldehyde solution (60% solution in butyl alcohol) | 1.99 |
| Oil-modified phenol formaldehyde solution (60% solution in petroleum xylol) | .54 |
| Manganese naphthenate drier | .68 |
| Mineral spirits | 7.43 |
| High flash petroleum naphtha | 22.24 |
| | 100.00 |

Alkyd resin F was a 50% China-wood oil/soya bean oil-modified pentaerythritol phthalate.

The copolymer of β-diethylaminoethylmethacrylate had 80% β-diethylaminoethylmethacrylate and 20% ethylmethacrylate.

This enamel contained 1% of the copolymer based on the solids of the alkyd resin present, the copolymer having a medium low degree of polymerization, i. e., a 50% solution in xylene had a viscosity of 1.3 poises.

EXAMPLE 6

*Metallic Gray baking enamel*

| | Per cent |
|---|---|
| Bone black | .67 |
| Lamp black | .68 |
| Red iron oxide | .48 |
| Rutile titanium dioxide | 1.83 |
| Alkyd resin A solution (55% solution in high flash petroleum naphtha) | 10.82 |
| Alkyd resin A solution (75% solution in high flash petroleum naphtha) | .33 |
| Alkyd resin F solution (50% solution in high flash petroleum naphtha) | 54.75 |
| Aluminum paste | .70 |
| Oil-modified phenol formaldehyde solution (60% solution in petroleum xylol) | 1.33 |
| Butanol-modified urea formaldehyde solution (33% solution in 33% butyl alcohol and 67% high flash petroleum naphtha) | 2.27 |
| Manganese naphthenate drier | .40 |
| Soya lecithin solution (50% solution in mineral spirits) | .04 |
| Creosole solution (1% solution in mineral spirits) | .08 |
| High flash petroleum naphtha | 24.23 |
| β-Diethylaminoethylmethacrylate polymer solution (50% solution in toluol) | 1.39 |
| | 100.00 |

This enamel contained 2.1% of β-diethylaminoethylmethacrylate based on the solids of the alkyd resin present, the polymer having a medium low degree of polymerization, i. e., a 50% solution in xylene had a viscosity of 2 poises.

EXAMPLE 7

*Metallic Green baking enamel*

| | Per cent |
|---|---|
| Monastral Green | 3.89 |
| Alkyd resin A solution (55% solution in high flash petroleum naphtha) | 17.75 |
| Alkyd resin E solution (50% solution in high flash petroleum naphtha) | .52 |
| Alkyd resin E solution (82.2% solution in high flash petroleum naphtha) | 34.13 |
| Aluminum paste | .43 |
| β-Diethylaminoethylmethacrylate polymer solution (50% solution in 90% ethyl alcohol and 10% acetic acid) | .34 |
| Butanol-modified urea formaldehyde solution (33% solution in 33% butyl alcohol and 67% high flash petroleum naphtha) | 2.08 |
| High flash petroleum naphtha | 34.95 |
| Mineral spirits | 5.91 |
| | 100.00 |

This enamel contained 0.44% of β-diethylaminoethylmethacrylate based on the solids of the alkyd resin present, the polymer having a low degree of polymerization, i. e., a 50% solution in xylene had a viscosity of 0.6 poise.

EXAMPLE 8

*Metallic Green baking enamel*

| | Per cent |
|---|---|
| Monostral Green | 2.65 |
| Alkyd resin A solution (55% solution in high flash petroleum naphtha) | 12.10 |
| Alkyd resin E solution (50% solution in high flash petroleum naphtha) | 45.50 |
| Aluminum paste | .38 |
| Butanol-modified urea formaldehyde solution (33% solution in 33% butyl alcohol and 67% high flash petroleum naphtha) | 2.50 |
| Methanol | 1.46 |
| High flash petroleum naphtha | 32.50 |
| Xylol | 2.33 |
| β-Diethylaminoethylmethacrylate polymer solution (50% solution in toluol) | .58 |
| | 100.00 |

This enamel contained 1% of β-diethylaminoethylmethacrylate based on the solids of the alkyd resin present, the polymer having a medium degree of polymerization, i. e., a 50% solution in xylene had a viscosity of 8.8 poises.

The aluminum paste of this example was similar to that of the previous examples, except it contained 55% aluminum powder.

EXAMPLE 9

*Metallic Green baking enamel*

| | Per cent |
|---|---|
| Monastral Green | 2.12 |
| Aluminum paste | .30 |
| Alkyd resin A solution (55% solution in high flash petroleum naphtha) | 9.67 |
| Alkyd resin G solution (50% solution in high flash petroleum naphtha) | 36.35 |
| Butanol-modified urea formaldehyde solution (33% solution in 33% butyl alcohol and 67% high flash petroleum naphtha) | 2.00 |
| β-Diethylaminoethylmethacrylate polymer solution (50% solution in toluol) | .47 |
| Methanol | 1.17 |
| High flash petroleum naphtha | 46.05 |
| Xylol | 1.87 |
| | 100.00 |

Alkyd resin G was a 50% soya bean oil-modified pentaerythritol phthalate.

This enamel contained 1% of β-diethylaminoethylmethacrylate based on the solids of the alkyd resin present, the polymer having a medium degree of polymerization, i. e., a 50% solution in xylene had a viscosity of 8.8 poises.

The aluminum paste was the same as that used in Example 8.

EXAMPLE 10

*Metallic Green baking enamel*

| | Per cent |
|---|---|
| Monastral Green | 2.33 |
| Alkyd resin A solution (55% solution in high flash petroleum naphtha) | 10.62 |
| Alkyd resin H solution (50% solution in high flash petroleum naphtha) | 39.98 |
| Aluminum paste | .33 |
| β-Diethylaminoethylmethacrylate polymer solution (50% solution in toluol) | .51 |
| Methanol | 1.28 |
| Xylol | 2.05 |
| High flash petroleum naphtha | 40.70 |
| Butanol-modified urea formaldehyde solution (33% solution in 33% butyl alcohol and 67% high flash petroleum naphtha) | 2.20 |
| | 100.00 |

Alkyd resin H was a 50% dehydrated castor oil-modified glyceryl phthalate.

This enamel contained 1% of β-diethylaminoethylmethacrylate based on the solids of the alkyd resin present, the polymer having a medium degree of polymerization, i. e., a 50% solution in xylene had a viscosity of 8.8 poises.

The aluminum paste was the same as that used in Example 8.

EXAMPLE 11

Metallic Maroon baking enamel

| | Per cent |
|---|---|
| β - Diethylaminoethylmethacrylate polymer solution (50% solution in toluol) | 2.63 |
| Arylide Maroon (dark) | 7.31 |
| Aluminum paste | .66 |
| Alkyd resin A solution (55% solution in high flash petroleum naphtha) | 6.49 |
| Alkyd resin F solution (50% solution in high flash petroleum naphtha) | 48.76 |
| Butanol-modified urea formaldehyde solution (60% solution in butyl alcohol) | 8.22 |
| Oil-modified phenol formaldehyde solution (60% solution in petroleum xylol) | 1.12 |
| Cobalt naphthenate drier | .15 |
| Coconut oil fatty acids | .10 |
| V. M. & P. naphtha | 3.49 |
| High flash petroleum naphtha | 21.07 |
| | 100.00 |

The cobalt drier used in this and the following examples was a solution in mineral spirits containing 2% of the metal.

This enamel contained 4.7% of β-diethylaminoethylmethacrylate based on the solids of the alkyd resin present, the polymer having a medium low degree of polymerization, i. e., a 50% solution in xylene had a viscosity of 2 poises.

The aluminum paste was the same as that used in Example 8.

EXAMPLE 12

Metallic Gold baking enamel

| | Per cent |
|---|---|
| β - Diethylaminoethylmethacrylate polymer solution (50% solution in toluol) | 1.87 |
| Hydrated iron oxide | 7.12 |
| Alkyd resin E solution (55% solution in high flash petroleum naphtha) | 6.44 |
| Alkyd resin F solution (50% solution in high flash petroleum naphtha) | 42.67 |
| Oil-modified phenol formaldehyde solution (60% solution in petroleum xylol) | 1.87 |
| Melamine formaldehyde solution (50% solution in butyl alcohol) | 12.36 |
| Aluminum paste | .62 |
| Mineral spirits | 7.74 |
| High flash petroleum naphtha | 18.58 |
| Cobalt naphthenate drier | .73 |
| | 100.00 |

This enamel contained 3.8% of β-diethylaminoethylmethacrylate based on the solids of the alkyd resin present, the polymer having a medium low degree of polymerization, i. e., a 50% solution in xylene had a viscosity of 2 poises.

The aluminum paste was the same as that used in Example 8.

EXAMPLE 13

Metallic Aluminum air-drying enamel

| | Per cent |
|---|---|
| Aluminum paste | 3.11 |
| Alkyd resin E solution (50% solution in high flash petroleum naphtha) | 37.33 |
| β - Diethylaminoethylmethacrylate (solids) | 2.08 |
| Oil-modified phenol formaldehyde solution (60% solution in petroleum xylol) | .68 |
| Lead naphthenate drier | .68 |
| Manganese naphthenate drier | .32 |
| Cobalt naphthenate drier | .27 |
| Toluol | 55.53 |
| | 100.00 |

The β-diethylaminoethylmethacrylate polymer was dissolved in the toluol and the other ingredients were then added.

The lead drier used in this and the following example was a solution in mineral spirits containing 16% of the metal.

This enamel contained 11.1% of β-diethylaminoethylmethacrylate polymer based on the solids of the alkyd resin present, the polymer having a low degree of polymerization.

EXAMPLE 14

Metallic Blue air-drying enamel

| | Per cent |
|---|---|
| Aluminum paste | 0.20 |
| Iron Blue | 2.52 |
| Alkyd resin A solution (55% solution in high flash petroleum naphtha) | 7.69 |
| Alkyd resin E solution (50% solution in mineral spirits) | 28.82 |
| β-Diethylaminoethylmethacrylate polymer (solids) | 2.05 |
| Oil-modified phenol formaldehyde solution (60% solution in petroleum xylol) | .34 |
| Lead naphthenate drier | .34 |
| Manganese naphthenate drier | .52 |
| Cobalt naphthenate drier | .23 |
| High flash petroleum naphtha | 2.39 |
| Toluol | 54.90 |
| | 100.00 |

The β-diethylaminoethylmethacrylate polymer was introduced in the same manner as described in Example 13.

This enamel contained 11% of β-diethylaminoethylmethacrylate based on the solids of the alkyd resin present, the polymer having a low degree of polymerization.

As shown by Example 5, it is also possible to use copolymers of a β-dialkylaminoalkylmethacrylate in the practice of this invention.

The amount of β-dialkylaminoalkylmethacrylate polymer necessary to impart the improved qualities to the metallic enamels of this invention depends upon the degree of polymerization of the polymer. These polymers can be obtained in various degrees of polymerization, and the degree of polymerization is indicated by the viscosity of a 50% solution in xylene.

Referring to the chart herewith, two curves have been plotted, curve A representing the lower limits of polymer present which will produce the desired effect, and curve B representing the upper limits thereof. As indicated by the circled dots on the chart, if the degree of polymerization is high (viscosity of 40 poises or more), from 0.1% to 0.75% of the polymer will suffice; if the degree of polymerization is medium high (viscosity of about 20 poises), from 0.15% to 3.5% will suffice; if the degree of polymerization is medium (viscosity of about 10 poises), from 0.25% to 12% will suffice; if the degree of polymerization is medium low (viscosity of about 5 poises), at least 0.3% should be used; and if the degree of polymerization is low (viscosity of about 1 poise or less), at least .4% should be used, all percentages being based on the weight of the clear vehicle solids.

If the quantity of a polymer having one of the higher degrees of polymerization is increased much above the percentages shown on this chart, the coating composition will gel.

It is preferred to use a polymer of β-diethylaminoethylmethacrylate, and it is further preferred to use from 1% to 5% of one having a viscosity of .5 to 10 poises in a 50% xylene solution.

In addition to those described in the above examples, other solvents for the polymers of β-dialkylaminoalkylmethacrylate may be used, such as benzene, the lower alcohols, methyl isobutyrate, mineral spirits, aldehydes, ketones, and naphtha.

It will be obvious from the wide range of alkyd resins disclosed in the above examples that any oil-modified alkyd resin may be used in the practice of this invention.

Any pigment or combination of pigments may be used as the coloring material in the production of the metallic enamels disclosed herein, the selection thereof for a particular color effect being readily apparent to those skilled in the art.

The coating compositions of this invention, when sprayed, produce a polychromatic or metallic finish which is uniform and free from mottling, flooding, or sagging. They have good outdoor durability, high build, and high gloss, and they can be satisfactorily patched. Furthermore, they can be reduced with an inexpensive hydrocarbon thinner.

It is apparent that many widely different embodiments of this invention can be made without departing from the spirit and scope thereof; and, therefore, it is not intended to be limited except as indicated in the appended claims.

We claim:

1. A coating composition comprising an oil-modified alkyd resin vehicle, aluminum flakes, and a β-dialkylaminoalkylmethacrylate polymer, the latter being present in an amount falling within the range of the double curve represented by .1% to .75% when it has a high degree of polymerization, .25% to 5% when it has a medium degree of polymerization, and at least .4% when it has has a low degree of polymerization, the percentages being based on the alkyd resin solids.

2. A coating composition comprising an oil-modified alkyd resin vehicle, aluminum flakes, and a β-dialkylaminoalkylmethacrylate polymer, the latter being present in an amount falling within the range of the double curve represented by .1% to .75% when its viscosity is more than 40 poises, .15% to 3.5% when its viscosity is 20 poises, .2% to 5% when its viscosity is 15 poises, .225% to 8.5% when its viscosity is 12.5 poises, .25% to 12% when its viscosity is 10 poises, at least .3% when its viscosity is 5 poises, and at least .4% when its viscosity is less than 1 poise, the percentages being based on the alkyd resin solids and the viscosities being measured on a 50% solution in xylene.

3. A coating composition comprising an oil-modified alkyd resin vehicle, aluminum flakes, and a β-dialkylamino alkylmethacrylate polymer having a viscosity of between .5 poise and 10 poises, the latter being present in an amount of from 1% to 5% based on the alkyd resin solids and the viscosity being measured on a 50% solution in xylene.

4. The coating composition of claim 3 in which the polymer is β-diethylaminoethylmethacrylate.

5. The coating composition of claim 3 in which the oil-modified alkyd resin vehicle is a 50% linseed oil-modified glyceryl phthalate.

LE VERNE KENNETH OSDAL.
RALPH E. PIKE.

No references cited.